United States Patent
Hamaguchi et al.

(10) Patent No.: US 9,179,442 B2
(45) Date of Patent: Nov. 3, 2015

(54) WIRELESS COMMUNICATION SYSTEM, COMMUNICATION APPARATUS, COMMUNICATION METHOD, AND COMMUNICATION PROGRAM

(75) Inventors: Yasuhiro Hamaguchi, Osaka (JP); Kazunari Yokomakura, Osaka (JP); Osamu Nakamura, Osaka (JP); Jungo Goto, Osaka (JP); Hiroki Takahashi, Osaka (JP)

(73) Assignee: SHARP KABUSHIKI KAISHA, Tokyo (JP)

( * ) Notice: Subject to any disclaimer, the term of this patent is extended or adjusted under 35 U.S.C. 154(b) by 262 days.

(21) Appl. No.: 13/814,432

(22) PCT Filed: Aug. 2, 2011

(86) PCT No.: PCT/JP2011/067654
§ 371 (c)(1), (2), (4) Date: Feb. 21, 2013

(87) PCT Pub. No.: WO2012/018002
PCT Pub. Date: Feb. 9, 2012

(65) Prior Publication Data
US 2013/0142158 A1  Jun. 6, 2013

(30) Foreign Application Priority Data
Aug. 6, 2010  (JP) .................. 2010-177676

(51) Int. Cl.
*H04W 72/04* (2009.01)
*H04L 5/00* (2006.01)
(Continued)

(52) U.S. Cl.
CPC .............. *H04W 72/04* (2013.01); *H04L 1/005* (2013.01); *H04L 1/0055* (2013.01);
(Continued)

(58) Field of Classification Search
None
See application file for complete search history.

(56) References Cited

U.S. PATENT DOCUMENTS 8,280,396 B2 * 10/2012 Bachl et al. .................... 455/453
2010/0182903 A1 * 7/2010 Palanki et al. ................. 370/225
(Continued)

FOREIGN PATENT DOCUMENTS

| JP | 2009-284349 A | 12/2009 |
| JP | 2010-147946 A | 7/2010 |
| WO | WO 2010/064438 A1 | 6/2010 |

OTHER PUBLICATIONS

Kazunari Yokomakura et al., Spectrum-Overlapped Resource Management Using Dynamic Spectrum Control, Proceedings of the 2008 IEICE General Conference, p. 437, The Institute of Electronics, Information and Communication Engineers, Mar. 5, 2008.

*Primary Examiner* — Chi H Pham
*Assistant Examiner* — Shick Hom
(74) *Attorney, Agent, or Firm* — Birch, Stewart, Kolasch & Birch, LLP

(57) ABSTRACT

Provided are a wireless communication system, communication apparatus, communication method, and communication program able to more reliably decode transmit signals at a receiver without more complex processing, even when resource blocks are overloaded. A communication apparatus configured to decode data received on each of at least two streams comprises: a resource block allocation determiner configured to determine an allocation of resource blocks for each stream; and a control information determiner configured to determine control information regarding data transmission on at least one stream, on the basis of the overload ratio of resource blocks among at least one group of streams.

6 Claims, 12 Drawing Sheets

(51) Int. Cl.
*H04L 25/02* (2006.01)
*H04L 25/03* (2006.01)
*H04L 27/22* (2006.01)
*H04L 1/00* (2006.01)
*H04L 27/26* (2006.01)
*H04L 1/06* (2006.01)

(52) U.S. Cl.
CPC .......... *H04L 1/0071* (2013.01); *H04L 5/0044* (2013.01); *H04L 5/0053* (2013.01); *H04L 5/0094* (2013.01); *H04L 25/0232* (2013.01); *H04L 25/03171* (2013.01); *H04L 27/22* (2013.01); *H04L 1/06* (2013.01); *H04L 27/2636* (2013.01)

(56) References Cited

U.S. PATENT DOCUMENTS

2010/0234061 A1\* 9/2010 Khandekar et al. ........... 455/522
2011/0211646 A1   9/2011 Mashino et al.
2013/0039185 A1\* 2/2013 Teyeb et al. ................... 370/235

\* cited by examiner

FIG. 2
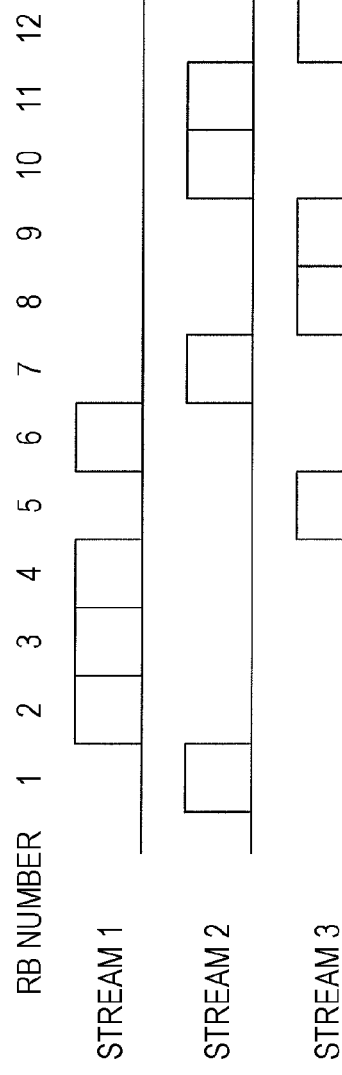
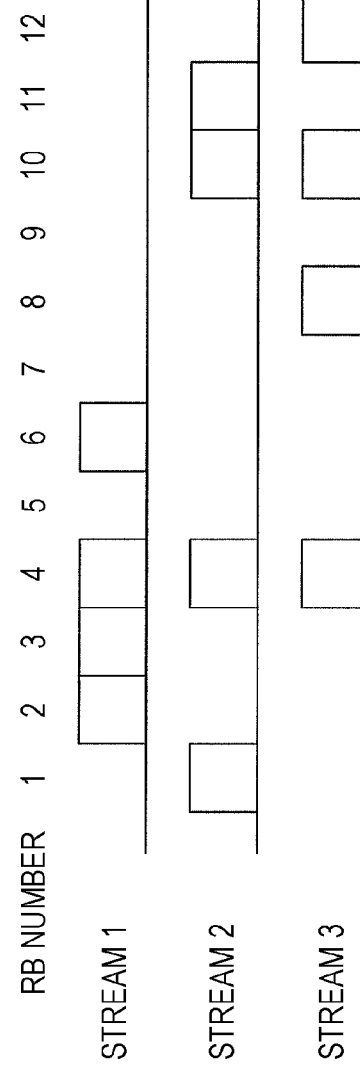

WIRELESS COMMUNICATION SYSTEM, COMMUNICATION APPARATUS, COMMUNICATION METHOD, AND COMMUNICATION PROGRAM

TECHNICAL FIELD

The present invention relates to a wireless communication system, communication apparatus, communication method, and communication program.

This application claims priority to Japanese Patent Application No. 2010-177676 filed in the Japan Patent Office on Aug. 6, 2010, the contents of which are hereby incorporated by reference.

BACKGROUND ART

With wireless communication, there is demand to effectively utilize the wireless frequency bands used as the propagation channel. For this reason, methods that multiplex streams for communicating among multiple users in a frequency domain are widely used. NPL 1 describes a spectrum-overlapped resource management (SORM) scheme that allows partial overlapping (hereinafter referred to as overloading) of a frequency band used by multiple streams. Consequently, the SORM scheme has superior spectral efficiency over frequency-division multiplexing (FDM), which controls the frequency bands to be used in a complete exclusive manner.

However, with wireless communication, errors may occur in transmitted information due to thermal noise in the receiver and frequency-selective phasing, and the spectral efficiency may drop. In order to correct errors in information, the application of turbo coding and decoding has been proposed (see PTL 1 and NPL 1).

In turbo coding, two recursive systematic convolutional (RSC) coders having the same connection are used, and the information bits constituting a receive signal are input as-is into one of the coders. The information bits are permutated by an interleaver and input into the other coder. Thus, information bits convoluted with two independent constraint parameters are generated. The turbo decoder decodes the information bits using two maximum a posteriori probability (MAP) estimators. The transmit bits may be detected by exchanging reliability information regarding the information bits obtained by decoding. In this way, by applying two independent constraint parameters and repeating the process, the reliability of the information bits gradually improves, and the transmit bits are detected.

CITATION LIST

Patent Literature

PTL 1: Japanese Unexamined Patent Application Publication No. 2009-284349

Non Patent Literature

NPL 1: Kazunari Yokomakura et al., "Spectral-Overlapped Resource Management Using Dynamic Spectrum Control", Proceedings of the 2008 IEICE General Conference, pg. 437, The Institute of Electronics, Information and Communication Engineers, Mar. 5, 2008.

SUMMARY OF INVENTION

Technical Problem

However, in the inventions described in PTL 1 and NPL 1, the mutual information with respect to the transmit data of the receive signal decreases with increasingly overloaded frequency bands between streams. For example, the drop in mutual information drops significantly in the case of large thermal noise compared to the power of the transmit signal. In such cases, equalization processing does not function normally, leading to the problem of being unable to decode the transmit data for each stream.

Being devised in light of the above points, it is an object of the present invention to provide a wireless communication system, communication apparatus, communication method, and communication program able to more reliably decode transmit data at a receiver without more complex processing, even for an overloaded propagation channel resource.

Solution to Problem (1) The present invention has been devised in order to solve the above problem, one mode of the invention being a wireless communication system including at least one first communication apparatus configured to transmit data, and a second communication apparatus configured to decode data received from the first communication apparatus on each of at least two streams. At least one of the first and the second communication apparatuses includes: a resource block allocation determiner configured to determine an allocation of resource blocks for each stream; and a control information determiner configured to determine control information regarding data transmission on at least one stream, on the basis of the overload ratio of resource blocks among at least one group of streams. The first communication apparatus includes a transmit controller configured to control data transmission on the streams on the basis of the determined control information.

(2) Also, another mode of the present invention is the wireless communication system according to (1), wherein the control information is transmit power information.

(3) Also, another mode of the present invention is the wireless communication system according to (2), wherein the control information determiner is configured to determine the transmit power information so as to increase the transmit power for at least one stream as the overload ratio increases.

(4) Also, another mode of the present invention is the wireless communication system according to (2), wherein the control information determiner is configured to determine the transmit power information so as to increase the transmit power for streams with more resource blocks in use.

(5) Also, another mode of the present invention is the wireless communication system according to claim (2), wherein the control information determiner is configured to determine the transmit power of each stream on the basis of the total transmit power for all streams related to data transmission from the first communication apparatus.

(6) Also, another mode of the present invention is the wireless communication system according to (1), wherein the control information is modulation scheme information.

(7) Also, another mode of the present invention is the wireless communication system according to (6), wherein the control information additionally includes transmit power information, and in the control information determiner, the transmit power information is determined such that the transmit power increases for streams having a modulation scheme with lower spectral efficiency as indicated by the modulation scheme information.

(8) Also, another mode of the present invention is the wireless communication system according to (1), wherein the control information is code rate information.

(9) Also, another mode of the present invention is the wireless communication system according to (8), wherein the control information includes transmit power information, and in the control information determiner, the transmit power information is determined such that the transmit power increases for streams having a code rate with lower spectral efficiency.

(10) Also, another mode of the present invention is the wireless communication system according to (1), wherein the control information is precoder matrix information.

(11) Also, another mode of the present invention is the wireless communication system according to (10), wherein the second communication apparatus includes: a propagation channel characteristics estimator configured to estimate the characteristics of the propagation channel between the first communication apparatus and the second communication apparatus, wherein the control information determiner includes a storage configured to store at least two precoder matrices whose elements are weighting coefficients for the transmit signal on each stream. In the case where the overload ratio is great than a preset value, the control information determiner is configured to select, as the control information, the precoder matrix with the largest differential between the maximum eigenvalue and the minimum eigenvalue of a second-order matrix obtained from the product vectors of the precoder matrices and a propagation channel vector made up of the propagation channel characteristics, and the transmit controller is configured to multiply the precoder matrix by a vector whose elements are the data in each stream.

(12) Also, another mode of the present invention is a communication apparatus comprising: a control information determiner configured to determine control information regarding data transmission on at least one stream, on the basis of the overload ratio of resource blocks among at least one group of streams; and a transmit controller configured to control data transmission on the streams on the basis of the determined control information.

(13) Also, another mode of the present invention is a communication method comprising determining control information regarding data transmission on at least one stream, on the basis of the overload ratio of resource blocks among at least one group of streams; and controlling data transmission on the streams on the basis of the determined control information.

(14) Also, another mode of the present invention is the communication method according to (13), wherein the control information at least includes any of transmit power information, code rate information, and precoder matrix information.

(15) Also, another mode of the present invention is a communication program causing a computer included in a communication apparatus to execute: determining control information regarding data transmission on at least one stream, on the basis of the overload ratio of resource blocks among at least one group of streams; and controlling data transmission on the streams on the basis of the determined control information.

(16) Also, another mode of the present invention is a communication apparatus configured to decode data received on each of at least two streams, the communication apparatus comprising: a resource block allocation determiner configured to determine an allocation of resource blocks for each stream; and a control information determiner configured to determine control information regarding data transmission on at least one stream, on the basis of the overload ratio of resource blocks among at least one group of streams.

(17) Also, another mode of the present invention is a communication method for a communication apparatus configured to decode data received on at least two streams, the communication method comprising: determining an allocation of resource blocks for each stream; and determining control information regarding data transmission on at least one stream, on the basis of the overload ratio of resource blocks among at least one group of streams.

(18) Also, another mode of the present invention is a communication program causing a computer included in a communication apparatus configured to decode data received on at least two streams to execute: determining an allocation of resource blocks for each stream; and determining control information regarding data transmission on at least one stream, on the basis of the overload ratio of resource blocks among at least one group of streams.

Advantageous Effects of Invention

According to the present invention, data transmission is controlled on the basis of a control variable determined on the basis of the overload ratio between the streams of the propagation channel resource. For this reason, drops in the likelihood of the receive signal for at least one stream are mitigated, decreasing the possibility of equalization processing failure. Thus, it is possible to more reliably decode a transmit signal at a receiver without more complex processing.

BRIEF DESCRIPTION OF DRAWINGS

FIG. 2 is a diagram illustrating per-stream RB allocation conditions according to the first embodiment of the present invention.

DESCRIPTION OF EMBODIMENTS

First Embodiment

Figure 1:
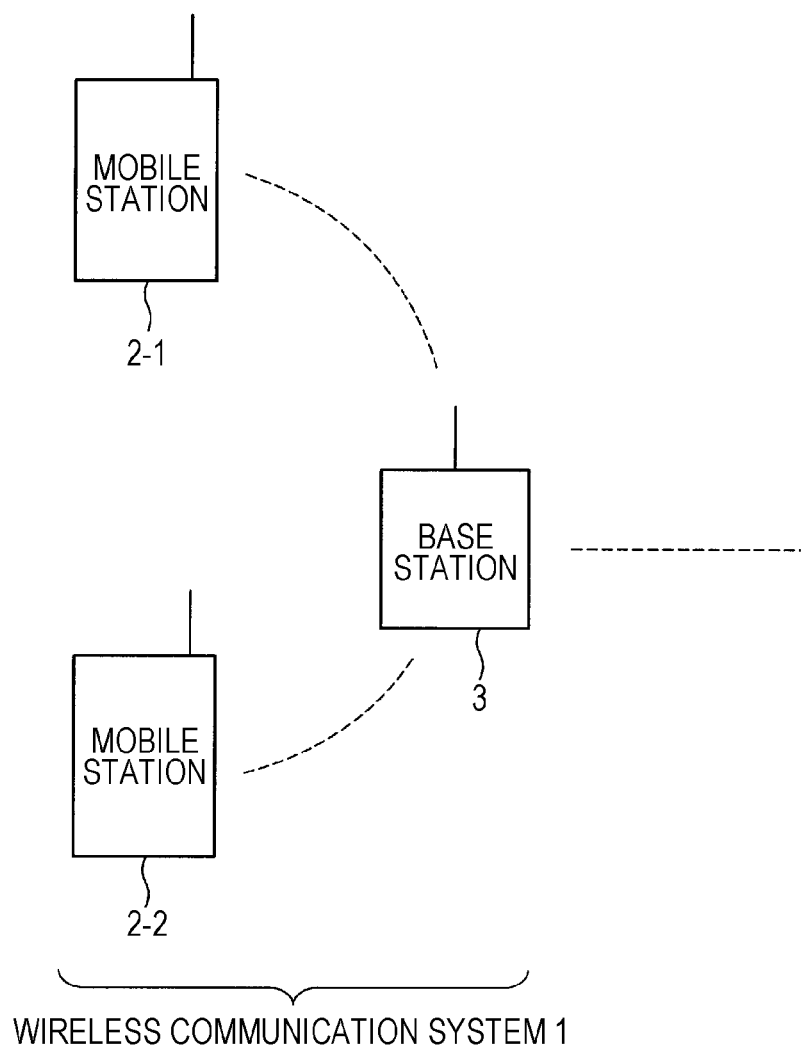
FIG. 1 is a conceptual diagram of a communication system according to the first embodiment of the present invention.

Hereinafter, embodiments of the present invention will be described in detail and with reference to the drawings. FIG. 1 illustrates an exemplary configuration of a wireless communication system 1. The wireless communication system 1 includes one or more mobile stations 2-1 and 2-2, and a base station 3. Although FIG. 1 depicts two mobile stations, these will be simply designated the mobile station 2 for convenience when it is not necessary to distinguish them. One mobile station 2-1 is a communication apparatus that transmits and receives information to and from the other mobile station 2-2 via the base station 3. A mobile station may be a mobile phone handset, for example. The base station 3 is a communication apparatus that receives information from the mobile stations 2-1 and 2-2, and transmits that information to the other mobile station 2-2 and 2-1, respectively. Electromagnetic waves propagating primarily through the air are used as the propagation channel for the transmitting and receiving of information.

Note that the transmitting and receiving of information to and from the base station 3 may be conducted directly from the mobile station 2-1 or 2-2, but may also be conducted via another base station or a public communication network. However, in the present embodiment, the description will focus on transmitting data directly from a mobile station 2 to a base station 3 for the sake of convenience. Also, in the present embodiment, the data transmission scheme may be discrete Fourier transform spread orthogonal frequency-division multiplexing (DFT-S-OFDM), for example.

A stream designates a unit of a propagation channel on which information is transmitted and received between spatially separated communication apparatus. In the present embodiment, identical data is assumed to be transmitted from one or multiple transmitting means (transmit antennas) for each individual stream. Furthermore, in the present embodiment, resource blocks (hereinafter designated RB) which constitute each stream are assumed to be allocated according to the SORM scheme. In the SORM scheme, multiple transmitters (or multiple transmit streams in a single transmitter) communicate by selecting one or multiple RBs, irrespective of the number of receive antennas (or in other words, the number of independently processable streams that can be received). For this reason, for a given RB there is a possibility of overlapping data transmissions in a number of streams that exceeds the number of receive antennas. Note that the RBs indicate the units of access in frequency domain allocated to each stream, with each RB containing a given number of one or more sub-carriers.

An example of per-stream RB allocation conditions will now be described. FIG. 2 is a diagram illustrating an example of per-stream RB allocation conditions. Herein, (a) illustrates the frequency-division multiplexing (FDM) scheme while (b) illustrates the SORM scheme for the case where there are 12 RBs and 3 streams usable across the entire system, with 4 RBs being actually used by each stream. In both (a) and (b), the horizontal axis represents RBs, and indicates the RBs being used by each stream. Each square represents one RB in use.

The FDM scheme does not allow the overloading of RBs among streams, and each stream uses its RBs exclusively. For example, (a) depicts the RBs numbered 2, 3, 4, and 6 being allocated to stream 1, the RBs numbered 1, 7, 10, and 11 being allocated to stream 2, and the RBs numbered 5, 8, 9, and 12 being allocated to stream 3.

In contrast, the SORM scheme allows RB overloading. For example, (b) depicts the RBs numbered 2, 3, 4, and 6 being allocated to stream 1, the RBs numbered 1, 4, 10, and 11 being allocated to stream 2, and the RBs numbered 4, 8, 10, and 12 being allocated to stream 3. In other words, (b) depicts using the RB numbered 4 overlapped across streams 1, 2, and 3, and using the RB numbered 10 overlapped across streams 2 and 3. In other words, this example depicts an overloaded state, namely a state in which two or more streams simultaneously use an RB in the case where there is one receive antenna at the base station 3. In addition, the ratio of the number of overloaded RBs versus the number of RBs used by each stream is designated the overload ratio. In this example, the overload ratio of stream 1 is 0.25, while the overload ratio of streams 2 and 3 is 0.5. The overload ratio will be discussed later.

As in the example, it is necessary to estimate the transmit signal by equalization in order to receive a signal with at least partially overloaded RBs. Frequency domain soft canceller followed by minimum mean square error (SC/MMSE), time domain SC/MMSE, or maximum a posteriori probability (MAP) equalization technology may be used for equalization, for example. The present embodiment will be described under the presumption of using frequency domain SC/MMSE turbo equalization technology (hereinafter, turbo equalization). However, iterative processing (turbo equalization) is not a requirement of an embodiment of the present invention. For example, serial interference canceller (SIC) processing may also be applied, in which one signal is detected first, a replica is created from the detected results and subtracted from the receive signal, and the remaining signal is subsequently detected.

Also, unless specifically stated otherwise, it is presumed that the mobile station 2 is equipped with two transmit antennas, with different data being simultaneously transmitted from the respective transmit antennas to access a base station 3 having one receive antenna. In other words, in this example, a single mobile station 2 transmits data to the base station 3 in two streams. From the perspective of RB allocation, this case is equivalent to the case where two mobile stations 2 that each use a single antenna to simultaneously transmit data to a base station 3 having a single receive antenna. In other words, in either case it is possible to employ a method of determining a transmit parameter on the basis of the overload ratio between the streams as discussed later, and controlling data transmission on the basis of that transmit parameter.

Figure 3:
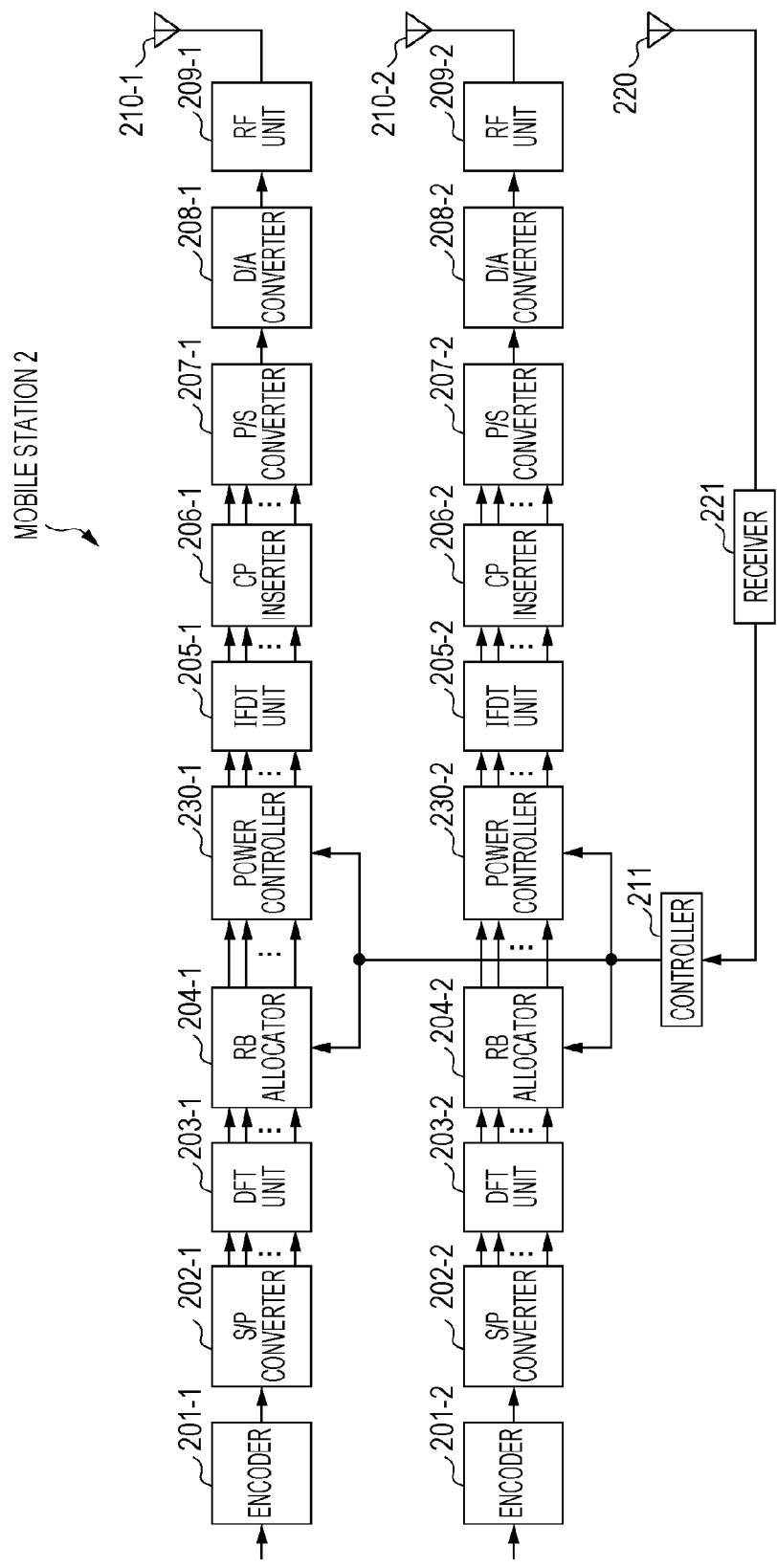
FIG. 3 is a configuration diagram illustrating an example of a mobile station according to the first embodiment of the present invention.

Next, an exemplary configuration of a mobile station 2 according to the present embodiment will be described. FIG. 3 is a configuration diagram illustrating an example of a mobile station 2 according to the present embodiment. The mobile station 2 includes transmit antennas 210-$x$ (where $x=1$ to N; in the case of two streams, N=2), a receive antenna 220, a receiver 221, a controller 211, encoders 201-$x$, serial/parallel (S/P) converters 202-$x$, discrete Fourier transform (DFT) units 203-$x$, RB allocators 204-$x$, power controllers 230-$x$, inverse discrete Fourier transform (IDFT) units 205-$x$, cyclic prefix (CP) inserters 206-$x$, parallel/serial (P/S) converters 207-$x$, digital/analog (D/A) converters 208-$x$, and radio frequency (RF) units 209-$x$.

The receive antenna 220 receives an electromagnetic wave transmitted by the base station 3 as a receive signal, and outputs the receive signal to the receiver 221.

The receiver 221 downconverts the input signal from the receive antenna 220 to a baseband signal and also applies analog/digital conversion and a discrete Fourier transform to generate control information and payload data. The receiver 221 outputs the control information to the controller 211. The control information includes transmit power information and RB allocation information. The transmit power information and the RB allocation information will be discussed later.

The controller 211 extracts transmit power information and RB allocation information from the control information input from the receiver 221. In addition, the controller 211 outputs the RB allocation information to the RB allocators 204-$x$, and outputs the transmit power information to the power controllers 230-$x$.

The encoders 201-$x$ add redundant bits, such as error-correcting code, to the input transmit data. The encoders 201-$x$ include an interleaver which permutates bit sequences on a per-frame basis in the transmit data with added redundant bits. The encoders 201-$x$ modulate the transmit data with permutated bit sequences, and output the results to the S/P converters 202-$x$. A scheme such as binary phase shift keying (BPSK), quadrature phase shift keying (QPSK), 8 phase shift keying (8 PSK), 16 quadrature amplitude modulation (16QAM), or 64QAM may be used for modulation.

The S/P converters 202-$x$ accept the output signals from the encoders 201-$x$ as input and convert the output signals into a given number of parallel signals. Note that this given number matches the number of sub-carriers allocated to transmission of the stream. The S/P converters 202-$x$ output the parallel signals to the DFT units 203-$x$.

The DFT units 203-$x$ apply the discrete Fourier transform to the signals input from the S/P converters 202-$x$ to generate frequency domain signals, which are output to the RB allocators 204-$x$.

The RB allocators 204-$x$ allocate the frequency domain signals input from the DFT units 203-$x$ to respective RBs on the basis of the RB allocation information input from the controller 211, and output the results to the power controllers 230-$x$.

The power controllers 230-$x$ accept the output signals from the RB allocators 204-$x$ as well as the transmit power information from the controller 211 as input. The power controllers 230-$x$ calculate a transmit power for each sub-carrier on the basis of the transmit power information. An exemplary method of calculating transmit power will be discussed later.

The power controllers 230-$x$ adjust the amplitudes of the individual output signals from the RB allocators 204-$x$ so as to reach the transmit power calculated for each sub-carrier, and output the results to the IDFT units 205-$x$.

Note that in the case of simultaneously modifying the transmit power by an equal factor for all sub-carriers, instead of the power controllers 230-$x$, the amplitudes of the output signals from the P/S converters 207-$x$ or the output signals from the D/A converters 208-$x$ may be adjusted to obtain the calculated the transmit power. In this case, the power controllers 230-$x$ are not required to calculate the transmit power for each sub-carrier, and may calculate the transmit power for each stream.

The IDFT units 205-$x$ accept the output signals from the power controllers 230-$x$ as input, and impress the input signals onto a pilot signal. The IDFT units 205-$x$ also apply the inverse discrete Fourier transform to the modulated pilot signals to convert them into a time domain signal, and output the results to the CP inserters 206-$x$.

The CP inserters 206-$x$ insert a CP of given length into the output signals from the IDFT units 205-$x$, and output the results to the P/S converters 207-$x$.

The P/S converters 207-$x$ accept the output signals from the CP inserters 206-$x$ as input, apply parallel/serial conversion to generate serial signals for each stream, and output the results to the D/A converters 208-$x$.

The D/A converters 208-$x$ convert the serial signals input from the P/S converters 207-$x$ into analog signals to generate baseband signals, and output the results to the RF units 209-$x$.

The RF units 209-$x$ upconvert the baseband signals input from the D/A converters 208-$x$ into radio frequency signals, which are output to the transmit antennas 210-$x$. The transmit antennas 210-$x$ accept the radio frequency signals from the RF units 209-$x$, and transmit the radio frequency signals to the base station 3 as electromagnetic waves.

Figure 4:
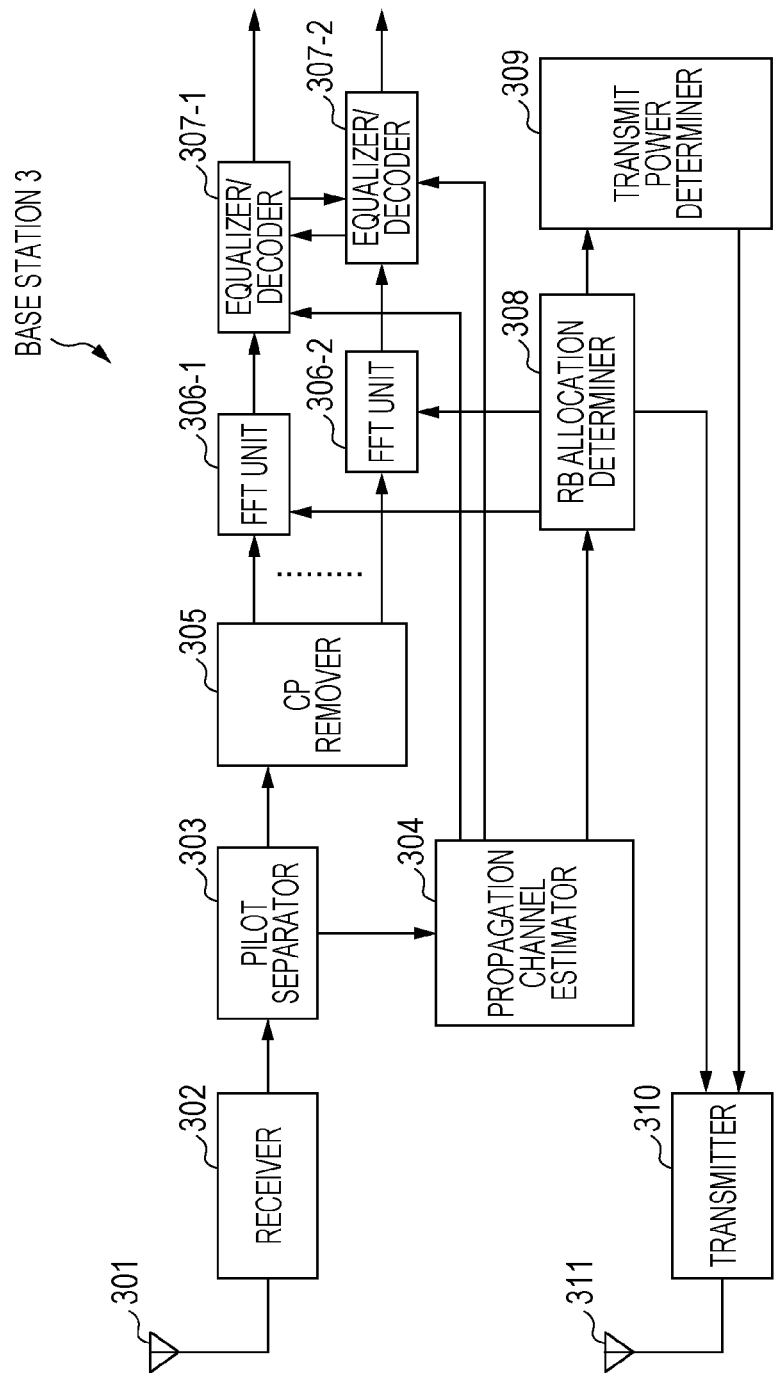
FIG. 4 is a configuration diagram illustrating an example of a base station according to the first embodiment of the present invention.

Next, an exemplary configuration of a base station 3 according to the present embodiment will be described. FIG. 4 is a configuration diagram illustrating an example of a base station 3 according to the present embodiment. The base station 3 includes a receive antenna 301, a receiver 302, a pilot separator 303, a propagation channel estimator 304, a CP remover 305, fast Fourier transform (FFT) units 306-$x$, equalizer/decoders 307-$x$, an RB allocation determiner 308, a transmit power determiner 309, a transmitter 310, and a transmit antenna 311.

The receive antenna 301 receives the radio frequency signals transmitted as electromagnetic waves from the mobile station 2, and outputs the radio frequency signals to the receiver 302.

The receiver 302 downconverts the radio frequency signals input from the receive antenna 301 to generate a baseband signal, which is output to the pilot separator 303.

The pilot separator 303 separates the baseband signal input from the receiver 302 into a pilot signal and a receive data signal. The pilot separator 303 outputs the pilot signal to the propagation channel estimator 304, and outputs the receive data signal to the CP remover 305.

On the basis of the pilot signal input from the pilot separator 303, the propagation channel estimator 304 estimates frequency response information regarding the propagation channel between the antennas at the mobile station 2 and the base station 3, as well as thermal noise variance information for the base station 3 (or alternatively, the average receive signal-to-noise ratio across the entire band). The propagation channel estimator 304 outputs the estimated propagation channel frequency response information and thermal noise variance information to the equalizer/decoders 307-$x$ and the RB allocation determiner 308 on a per-stream basis.

The CP remover 305 removes the CP from the receive data signal input from the pilot separator 303, and outputs a receive data signal with the CP removed to the FFT units 306-$x$.

The FFT units 306-$x$ apply the fast Fourier transform to the receive data signal input from the CP remover 305 to generate frequency domain signals. The FFT units 306-$x$ also extract the frequency domain signals of the RBs allocated to each stream on the basis of the RB allocation information input from the RB allocation determiner 308, and output the results to the equalizer/decoders 307-$x$.

The equalizer/decoders 307-$x$ accept the output signals from the FFT units 306-$x$, the propagation channel frequency response information and thermal noise variance information from the propagation channel estimator 304, and a receive signal replica from the equalizer/decoder 307-$y$ for another stream $y$ as input, and decode the bit sequence of the transmit data. The equalizer/decoders 307-$x$ will be later discussed in detail.

The RB allocation determiner 308 determines an RB allocation for each stream used for communication with the mobile station 2. At this point, the RB allocation determiner 308 may also determine allocation information so as to allocate a given number of RBs in order of the RBs with the largest propagation channel frequency response information (in other words, gain) estimated by the propagation channel estimator 304, for example. However, the present invention is not limited thereto, and predetermined RB allocation information may also be used, for example.

The RB allocation determiner 308 outputs the determined RB allocation information to the transmit power determiner 309 and the transmitter 310. The RB allocation information is transmitted to the mobile station 2 via the transmit antenna 311. The mobile station 2 receives the RB allocation information, and the RB allocators 204-$x$ allocate the frequency components of their transmit signals to frequency bands corresponding to the RB allocation information. In so doing, data is transmitted to the base station 3.

The transmit power determiner 309 determines the transmit power when the mobile station 2 transmits data signals to the base station 3. For example, the transmit power determiner 309 may calculate an offset f(i) in a closed loop for each frame i as the transmit power. The transmit power determiner 309 outputs transmit power information to the transmitter 310. A differential value between the transmit power for the current frame and the transmit power for the last frame, or the absolute value of the transmit power for the current frame may be used as the transmit power information thus output. Herein, a method of determining transmit power will be discussed later.

The transmitter 310 accepts the RB allocation information from the RB allocation determiner 308 and the transmit power information from the transmit power determiner 309 as input, and applies digital/analog conversion to a signal expressing control information containing the above information to generate a baseband signal. The transmitter 310 also upconverts the baseband signal to generate a radio frequency signal, which is output to the transmit antenna 311.

The transmit antenna 311 transmits the radio frequency signal input from the transmit antenna to the mobile station 2 as an electromagnetic wave.

Figure 5:
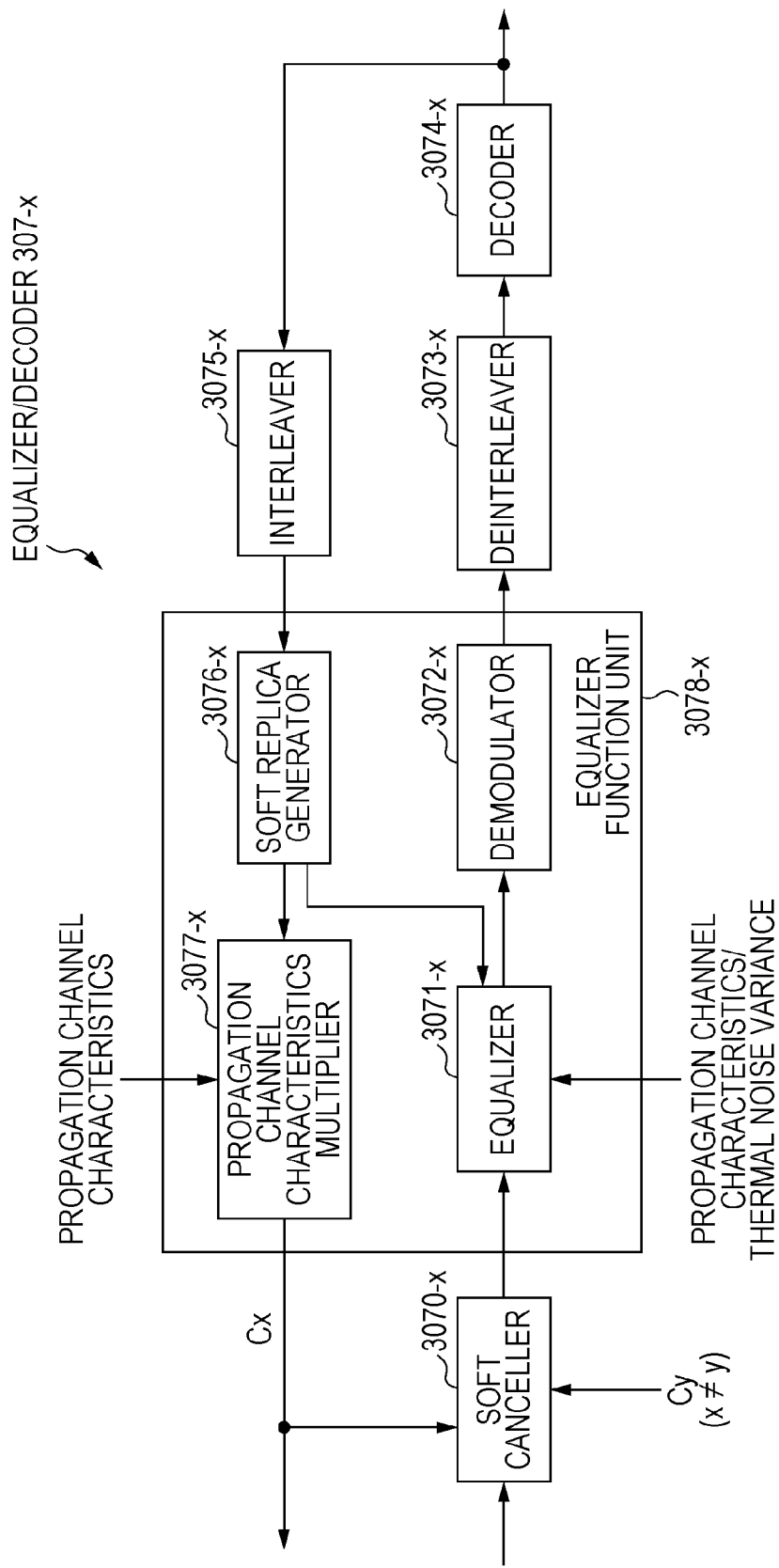
FIG. 5 is a configuration diagram illustrating an example of an equalizer/decoder according to the first embodiment of the present invention.

Next, the equalizer/decoders 307-$x$ in the present embodiment will be described. FIG. 5 is a configuration diagram illustrating an example of an equalizer/decoder 307-$x$. The equalizer/decoder 307-$x$ applies turbo equalization to a stream x, and estimates transmit data. The equalizer/decoder 307-$x$ includes a soft canceller 3070-$x$, an equalizer 3071-$x$, a demodulator 3072-$x$, a deinterleaver 3073-$x$, a decoder 3074-$x$, an interleaver 3075-$x$, a soft replica generator 3076-$x$, and a propagation channel characteristics multiplier 3077-$x$. Additionally, the portion including the equalizer 3071-$x$, the demodulator 3072-$x$, the soft replica generator 3076-$x$, and the propagation channel characteristics multiplier 3077-$x$ is called the equalizer function unit 3078-$x$.

Input into the soft canceller 3070-$x$ are the output signal from the FFT unit 306-$x$ for a target stream x, the receive signal replica Cx for the target stream x from the propagation channel characteristics multiplier 3077-$x$, and all receive signal replicas Cy for other interference streams y (where y is a stream other than x) from the equalizer/decoders 307-$y$ for the other interference streams y. The soft canceller 3070-$x$ subtracts the receive signal replicas Cx and Cy from the output signal from the FFT unit 306-$x$ to generate a residual signal. The soft canceller 3070-$x$ then outputs the residual signals to the equalizer 3071-$x$.

Input into the equalizer 3071-$x$ are the residual signal for the target stream x from the soft canceller 3070-$x$, a soft replica from the soft replica generator 3076-$x$, and propagation channel response information and thermal noise information from the propagation channel estimator 304. The equalizer 3071-$x$ generates an equalized signal by applying equalization according to frequency domain SC/MMSE on the basis of the propagation channel response information and the thermal noise information for the residual signal, and outputs the equalized signal to the demodulator 3072-$x$.

On the basis of the equalized signal input from the equalizer 3071-$x$, the demodulator 3072-$x$ computes the external log-likelihood ratio (LLR), or in other words the logarithm of the ratio of the likelihood of taking a bit value of +1 versus the likelihood of taking a bit value of −1. The demodulator 3072-$x$ outputs the external LLR to the deinterleaver 3073-$x$.

The deinterleaver 3073-$x$ rearranges the external LLRs input from the demodulator 3072-$x$ into the same order as the bit sequence input into the interleaver of the encoder 201-$x$, generating a pre-LLR. This rearranging process is called deinterleaving, and is equivalent to the reverse of the bit sequence permutation process in the interleaver of the encoder 201-$x$, in other words, the reverse of interleaving. The deinterleaver 3073-$x$ outputs the pre-LLR to the decoder 3074-$x$.

The decoder 3074-$x$ performs error correction on the pre-LLR input from the deinterleaver 3073-$x$ to compute a post-LLR with higher reliability, which is output to the interleaver 3075-$x$. Note that after repeating the processing in the equalizer/decoder 307-$x$ a given number of times, the decoder 3074-$x$ decodes the bit sequence of the transmit data by determining whether the bit values are +1 or −1, on the basis of whether the post-LLR is positive or negative.

The interleaver 3075-$x$ interleaves the post-LLR input from the decoder 3074-$x$ to generate a second post-LLR, which is output to the soft replica generator 3076-$x$. In this interleaving process, the signal is rearranged into the same order as in the bit sequence permutation process in the interleaver of the encoder 201-$x$.

The soft replica generator 3076-$x$ generates a soft replica on the basis of the second post-LLR input from the interleaver 3075-$x$. For example, in the case of implementing BPSK as the modulation scheme in the encoders 201-$x$, the signal values constituting the soft replica are computed as $\tan h(\lambda/2)$, where $\lambda$ is the second post-LLR value for a given bit. In other words, a signal value constituting the soft replica is computed using the function $\tan h(\lambda/2)$, which render the maximum and minimum values determining the range of that value into the bit values of +1 and −1 handled by the BPSK modulation scheme. The soft replica generator 3076-$x$ applies a fast Fourier transform to the soft replica to generate a frequency domain signal, which is output to the propagation channel characteristics multiplier 3077-$x$.

Input into the propagation channel characteristics multiplier 3077-$x$ are the frequency domain signal of the soft replica from the soft replica generator 3076-$x$, and propagation channel response information for the target stream x from the propagation channel estimator 304. The propagation channel characteristics multiplier 3077-$x$ multiplies the frequency domain signal of the soft replica by the propagation channel response information to generate a receive replica Cx for the target stream x. The propagation channel characteristics multiplier 3077-$x$ outputs the soft replica Cx to the soft cancellers 3070-$x$ and 3070-$y$ for the target stream x and interference streams y.

By repeating turbo equalization in this way, the equalizer/decoder 307-$x$ is able to correctly estimate the transmit data.

However, at the beginning of the process, the propagation channel characteristics multiplier 3077-x ordinarily does not generate a receive replica Cx, and since its value is zero, the soft canceller 3070-x effectively does not conduct the subtraction process.

Thus, if the transmit data transmitted from the mobile station 2 in the SORM scheme is restored using turbo equalization, it is possible to remove the effects of overloading on reception. It is also possible to maximize frequency-selective diversity gain. However, with a high overload ratio, there is a decreased amount of mutual information obtained in the initial stages such as the first and second iterations of the turbo equalization, leading to the problem of turbo equalization not behaving correctly. The reason for this is because in the past, the power controller 230-x of the mobile station 2 has determined the transmit power simply on the basis of Eq. 1.

$$P_{PUSCH}(i)=\min\{P_{CMAX}, 10\log_{10}(M_{PUSCH}(i))+P_{O\_PUSCH}(j)+\alpha(j)PL+\Delta_{TF}(i)+f(i)\} \quad (1)$$

In Eq. 1, $P_{PUSCH}(i)$ represent the transmit power value for the ith frame. Herein, PUSCH is an abbreviation of Physical Uplink Shared Channel, and means the data channel on which uplink data is transmitted. The term $\min\{X,Y\}$ represents the minimum value between X and Y. The term $P_{O\_PUSCH}(j)$ is a reference transmit power corresponding to a given variable j. The variable j is determined by components in an upper layer of the mobile station 2, such as the application layer, and specifies the transmit power according to these components. The term $M_{PUSCH}$ indicates the number of RBs used to transmit data in the mobile station 2. In other words, the transmit power $P_{PUSCH}(i)$ increases as the number of RBs in use increases. Also, PL represents the path loss, while $\alpha(j)$ is a multiplication coefficient corresponding to the given variable j. In other words, the path loss is specified according to components in an upper layer. The term $\Delta_{TF}(i)$ is the offset value according to factors such as the modulation scheme of the transmit signal. The term f(i) is a closed-loop transmit power control value computed by the transmit power determiner 309 in the base station 3. The term $P_{CMAX}$ is the maximum transmit power. The value used as $P_{CMAX}$ may be either the maximum transmit power that is physically realizable, or a value specified by a component in an upper layer.

In other words, the transmit power $P_{PUSCH}(i)$ is primarily determined by the maximum transmit power $P_{CMAX}$, the number of RBs used to transmit data as in $M_{PUSCH}$ or the closed-loop transmit power value f(i). However, in the present embodiment, a common, stream-independent value may be used for the closed-loop transmit power value f(i), rather than determining a value for each stream.

Under the above conditions, the transmit power determined on the basis of Eq. 1 is divided by the number of sub-carriers in use, and for simply determining the transmit power for each RB, the transmit power per RB transmitted from each transmit antenna (hereinafter, the transmit power density) becomes the same. If the sub-carriers are overloaded at this point, turbo equalization may not function sufficiently in the base station 3 in some cases. A case where such conditions occur will be described using FIG. 6.

Figure 6:
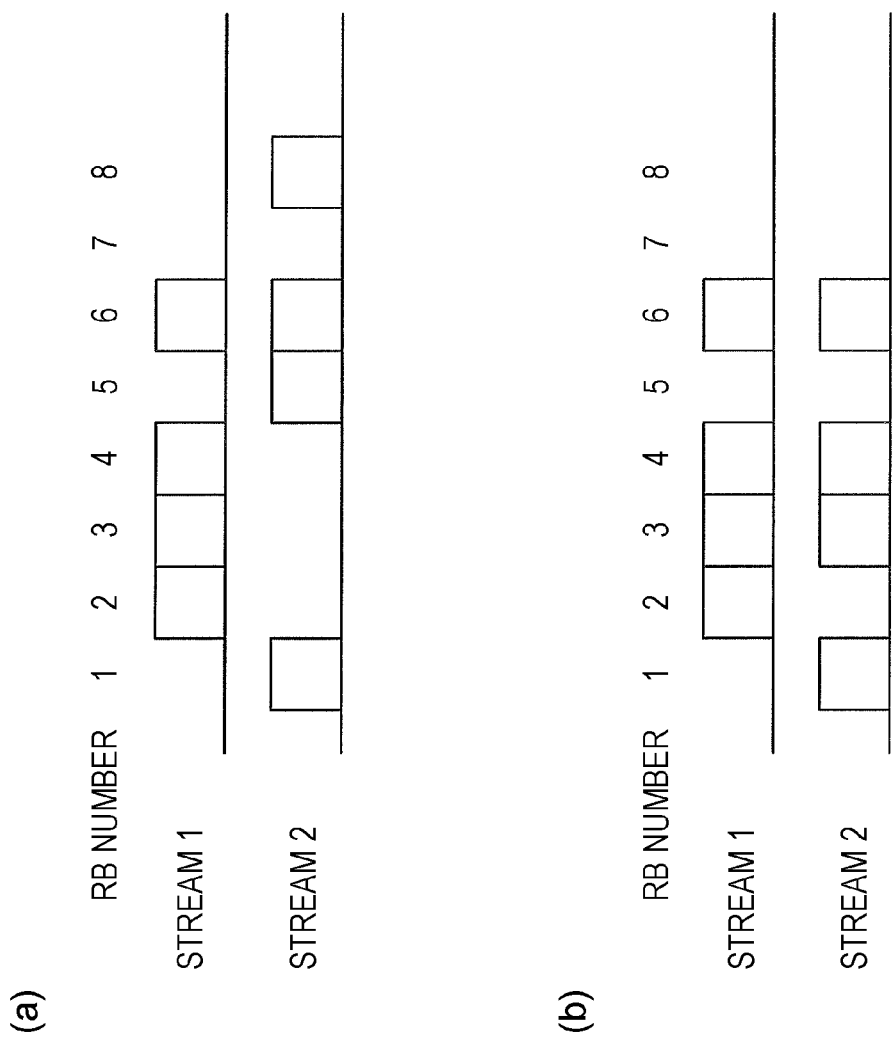
FIG. 6 is a diagram illustrating per-stream RB allocation conditions according to the first embodiment of the present invention.

FIG. 6 is a diagram illustrating an example of per-stream RB allocation conditions. Herein, there are 8 RBs and 2 streams usable across the entire system, with 4 RBs being actually used by each stream. (a) illustrates a typical case where turbo equalization functions sufficiently at the receiver, while (b) illustrates a typical case where turbo equalization does not function sufficiently, with each illustrating streams 1 and 2 in order from the top. In both cases, the horizontal axis is the RB number.

(a) depicts stream 1 using the RBs numbered 2, 3, 4, and 6, with stream 2 using the RBs numbered 1, 5, 6, and 8. In other words, there is one overlapping RB between the two streams. (b) depicts stream 1 using the RBs numbered 2, 3, 4, and 6, with stream 2 using the RBs numbered 1, 3, 4, and 6. In other words, there are three overlapping RBs between the two streams. This indicates that the success or failure of turbo equalization is dependent on the degree of RB overloading between streams. If the interference between receive signals due to RB overloading becomes significant in the initial stages of turbo equalization, or in other words during the stage before a receive signal replica is computed by the propagation channel characteristics multiplier 3077-x, the likelihood computed by the demodulator 3072-x becomes lower, increasing the probability that the transmit data will not be decodable. Conversely, in cases of low signal interference, the computed likelihood becomes higher, decreasing the probability that the transmit data will not be decodable.

Thus, in the present embodiment, a method able to decrease the effects of overloading by controlling a transmit parameter for each stream will be described. According to this method, in the first stage of turbo equalization between streams, mutual information is increased for a signal equalized by the equalizer function unit 3078-x for at least one of the streams, making it possible to more reliably decode the transmit data.

For example, the power controllers 230-x may compute different transmit powers among the streams on the basis of the overload ratio. More preferably, the transmit power is increased for at least one stream. In so doing, it is possible to mitigate the effects of signal interference among streams even with a high overload ratio, and decrease the probability of failure by the turbo equalization. For example, it is possible to increase the transmit power differential among streams as the overload ratio increases, as illustrated in FIG. 7.

Figure 7:
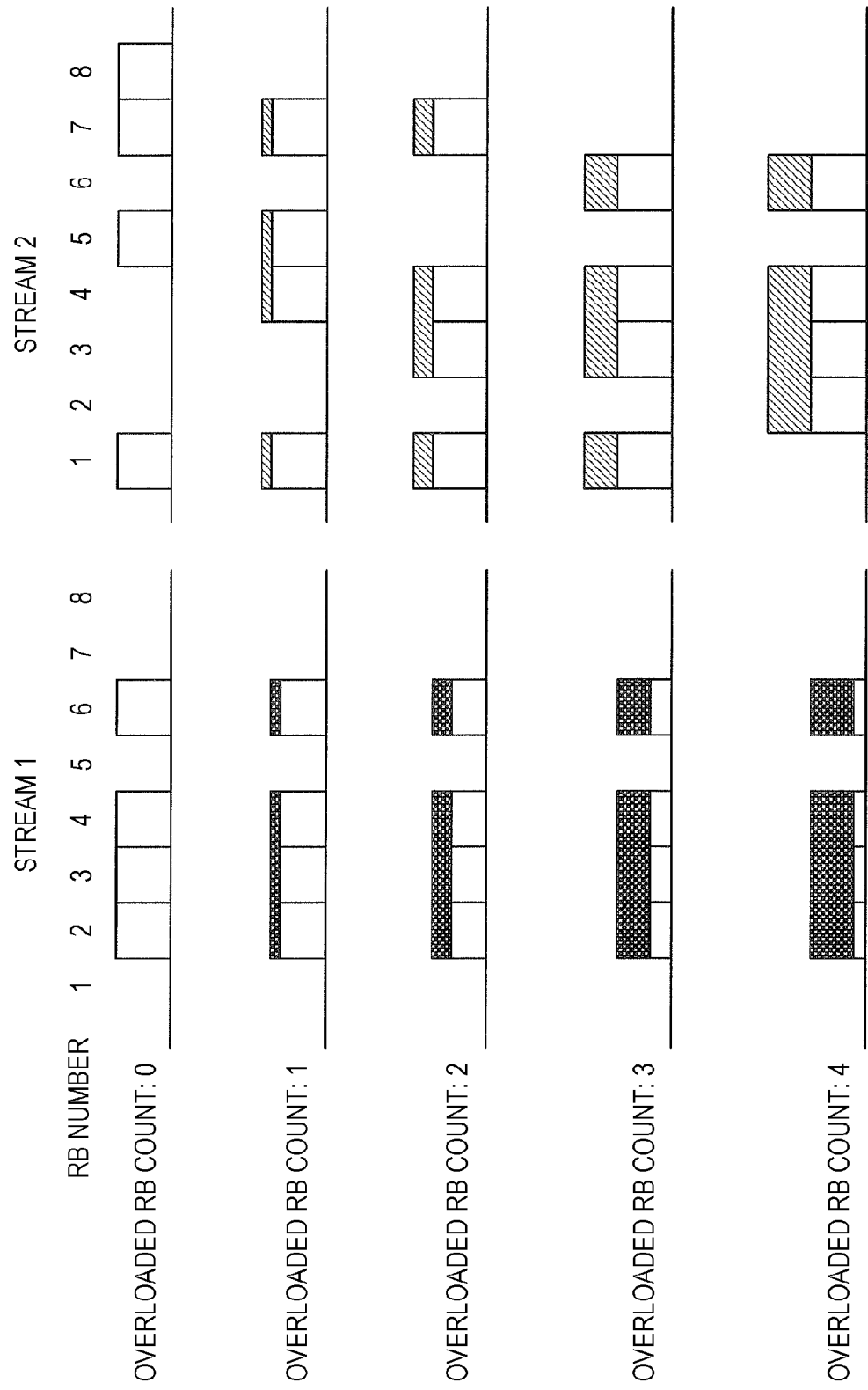
FIG. 7 is a diagram illustrating an example of transmit power controlled for different numbers of RBs that overlap between streams according to the first embodiment of the present invention.

FIG. 7 illustrates an example of transmit power for different numbers of RBs that overlap between streams. Herein, there are 8 RBs and 2 streams across the entire system, with each stream actually using 4 RBs. In FIG. 7, the numbers of RBs overlapping between streams are 0, 1, 2, 3, and 4 in order from the top. The horizontal axis is the RB number.

In all cases, stream 1 uses the RBs numbered 2, 3, 4, and 6, and the RB allocation is not varied. With stream 2, the RB allocation is varied on each row. Stream 2 uses the RBs numbered 1, 5, 7, and 8 on the top row, the RBs numbered 1, 4, 5, and 7 on the second row, the RBs numbered 1, 3, 4, and 7 on the third row, the RBs numbered 1, 3, 4, and 6 on the fourth row, and the RBs numbered 2, 3, 4, and 6 on the fifth row. The darkly shaded portions of stream 1 represent the decrease in the transmit power from the case of an overloaded RB count of 0. The lightly shaded portions of stream 2 represent the increase in the transmit power from the case of an overloaded RB count of 0. In other words, as the overload ratio increases, the transmit power is decreased for stream 1, and increased for stream 2. However, the transmit power for stream 2 takes a fixed positive value even if the overload ratio is 1. This value is made greater than at least the minimum value that enables detection of stream 2 transmit data from thermal noise and transmission distortion.

At this point, the power controllers 230-1 and 230-2 compute the transmit power $P_1(i)$ and $P_2(i)$ (dBm) of stream 1 and 2 for each frame i with the following formulas.

$$P_1(i) = 10\log_{10}\left(10^{\frac{P1-3}{10}} - X(ol)\right) \quad (2)$$

$$P_2(i) = 10\log_{10}\left(10^{\frac{P1-3}{10}} + X(ol)\right) \quad (3)$$

In Eqs. 2 and 3, P1 is the total transmit power (dBm) from the mobile station 2 obtained by Eq. 1. Also, the term (P1−3)/10 represents approximately half the power of P1 in the linear domain. Note that X(ol) is the change in the transmit power (mW) corresponding to the overload ratio ol. If the term (P1−3) is taken to be (P1−10 log$_{10}$ 2), the transmit power becomes exactly half of P1 in the linear domain.

For this reason, the mobile station 2 includes storage that stores transmit power changes X(ol) in association with overload ratios ol in advance, and the power controllers 230-1 and 230-2 retrieve the change X(ol) corresponding to the overload ratio ol from the storage when computing the transmit power P$_1$(i) and P$_2$(i). The change X(ol) takes larger values as the overload ratio becomes larger. Furthermore, the power controllers 230-1 and 230-2 compute a per-RB transmit power and control the transmit power as discussed above by subtracting the transmit power P$_1$(i) and P$_2$(i) by logarithms according to the number of sub-carriers respectively in use. This subtraction is equivalent to dividing the linear domain value by the number of sub-carriers.

Thus, according to Eqs. 2 and 3, it is possible to improve the probability of turbo equalization success in the base station 3 while keeping the total transmit power at a constant value P1. Particularly, since the transmit power increases according to the increase in the overload ratio, likelihood decreases are mitigated and the probability of equalization failure decreases for the transmit signal on stream 2. In addition, if equalization succeeds for the transmit signal on stream 2, likelihood decreases are mitigated and the probability of equalization success increases for the other transmit signal on stream 1. Consequently, by controlling the transmit power for each stream according to the overload ratio ol of the RBs between the streams, the probability of being able to decode the transmit data rises.

Figure 8:
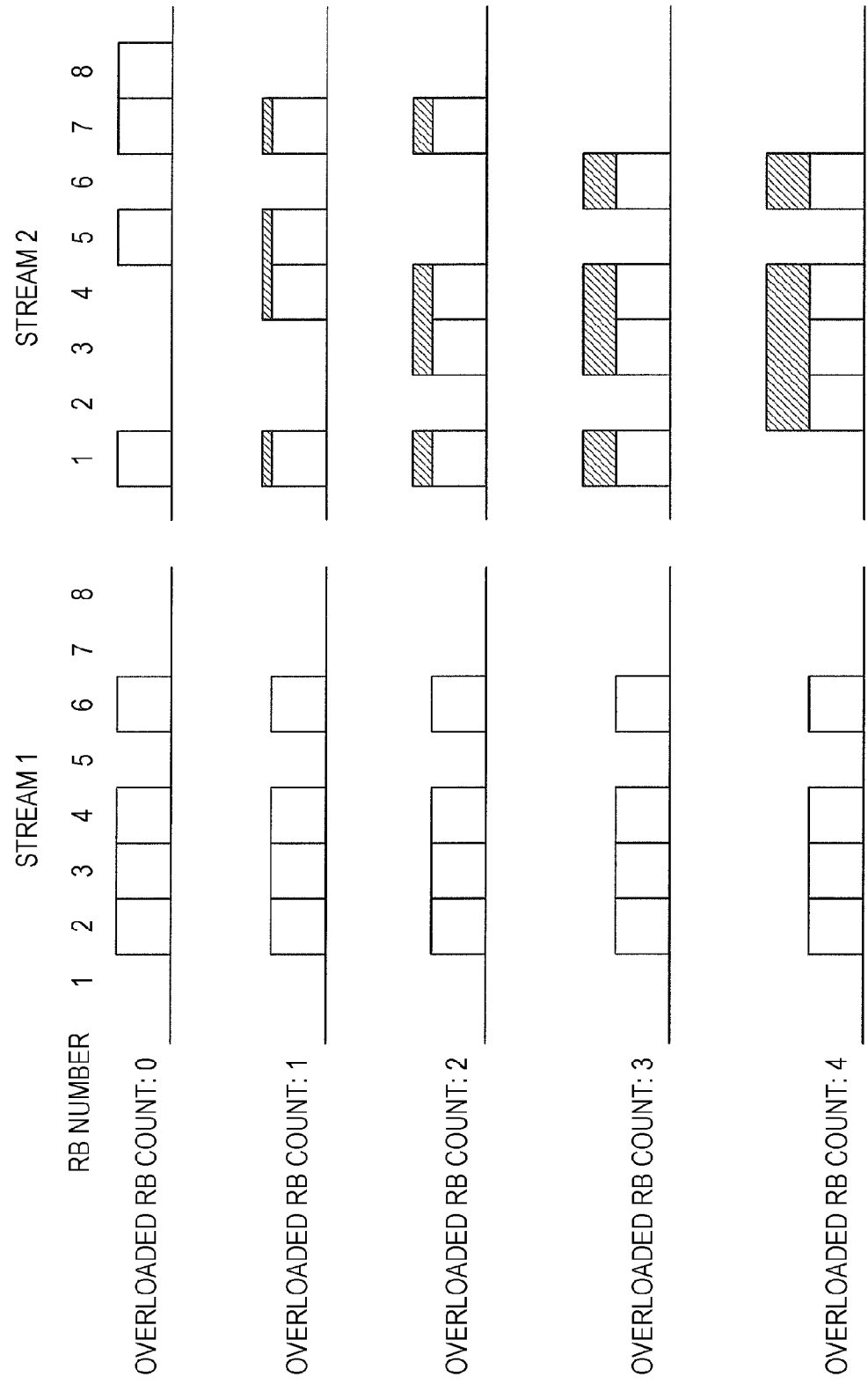
FIG. 8 is a diagram illustrating another example of transmit power controlled for different numbers of RBs that overlap between streams according to the first embodiment of the present invention.

Next, another embodiment that controls the transmit power between streams according to the overload ratio ol will be described using FIG. 8. Herein, there are 8 RBs and 2 streams across the entire system, with each stream actually using 4 RBs. The allocation of RBs to each stream for each number of RBs overlapping between streams in FIG. 8 is also similar to the case in FIG. 7. However, in stream 1, the transmit power is kept constant, irrespective of the overloaded RB count. Only the transmit power P$_2$(i) for the other stream 2 is increased according to the overload ratio ol. Although the total transmit power changes in the example illustrated in FIG. 8, not decreasing the transmit power avoids increased thermal noise effects in the base station 3.

At this point, the power controllers 230-1 and 230-2 compute the transmit power P$_1$(i) and P$_2$(i) according to the following respective formulas.

$$P_1(i) = P1-3 \quad (4)$$

$$P_2(i) = \min\{P_{CMAX}-3, P1-3+Y(ol)\} \quad (5)$$

In Eqs. 4 and 5, the units of the (P1−3) term are dBm, and thus the (P1−3) term represents approximately half the value of the total transmit power P1 in the linear domain. If the term (P1−3) is taken to be (P1−10 log$_{10}$ 2), the transmit power becomes exactly half of P1 in the linear domain. This holds similarly for (P$_{CMAX}$−3). The term Y(ol) is the increase in the transmit power (dBm) corresponding to the overload ratio ol. In other words, the mobile station 2 includes storage that stores transmit power increases Y(ol) in association with overload ratios ol in advance, and the transmit power controllers 203-1 and 203-2 retrieve the increase Y(ol) corresponding to the overload ratio ol from the storage when computing the transmit power P$_1$(i) and P$_2$(i). Herein, the increase Y(ol) takes larger values as the overload ratio becomes larger. Also, since Eq. 5 determines the transmit power to be the smaller of the terms (P1−3+Y(ol)) and (P$_{CMAX}$−3), the total transmit power in the mobile station 2 does not exceed P$_{CMAX}$.

In this way, in the present embodiment, control is applied to increase the transmit power for at least one stream according to the overload ratio. For this reason, it is possible to decrease the probability of turbo equalization failure in the base station 3 and more reliably decode transmit data, without more complex processing.

Second Embodiment

Hereinafter, a second embodiment of the present invention will be described in detail and with reference to the drawings. This embodiment shares the configuration of the first embodiment unless specifically noted.

Figure 9:
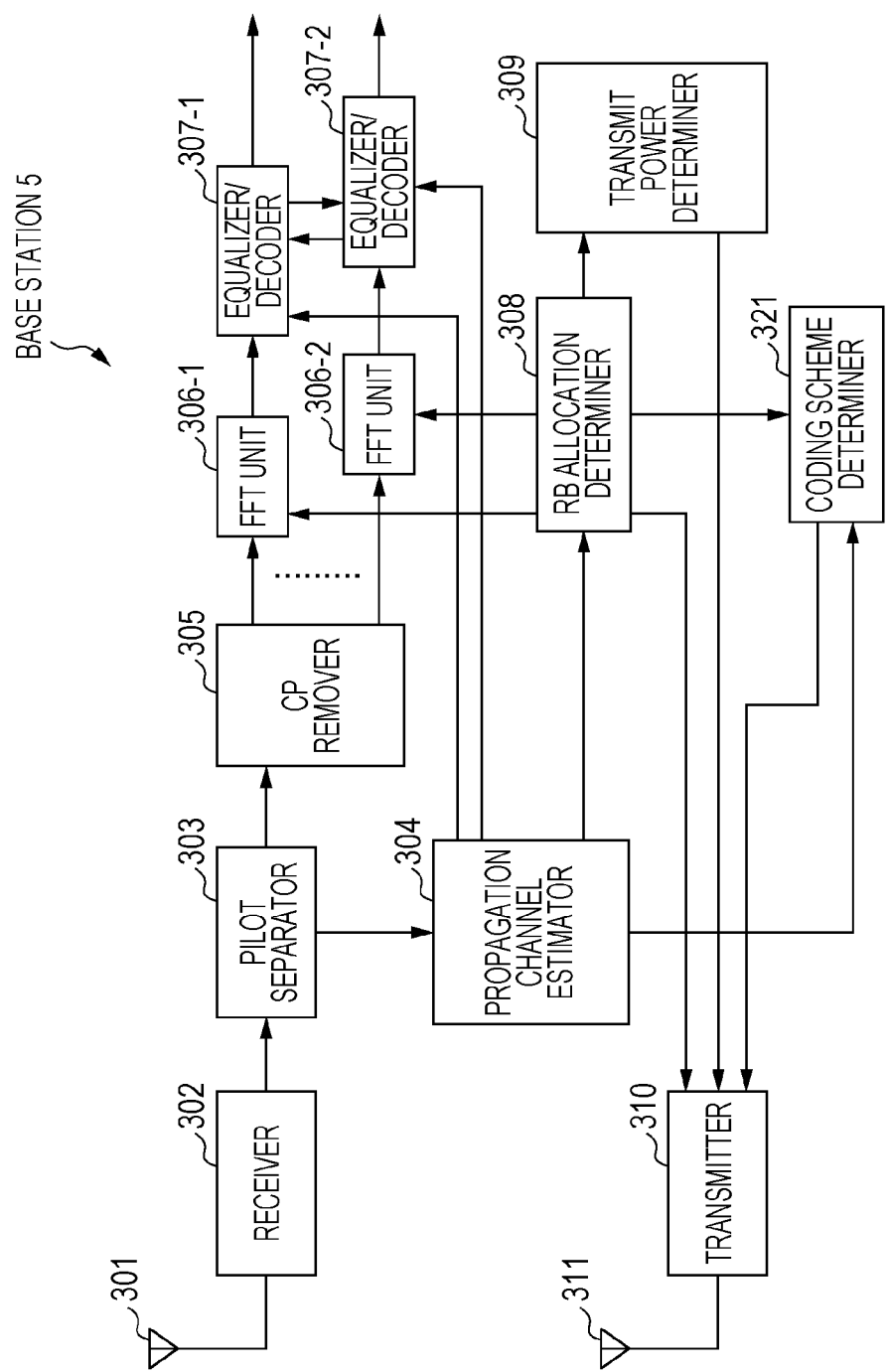
FIG. 9 is a configuration diagram illustrating an example of a base station according to the second embodiment of the present invention.

FIG. 9 is a configuration diagram illustrating an example of a base station 5 according to the present embodiment. The base station 5 includes a coding scheme determiner 321 in addition to the configuration of the base station 3 (FIG. 4). The RB allocation determiner 308 also outputs per-stream RB allocation information to the coding scheme determiner 321 as well as the transmitter 310. On the basis of the per-stream RB allocation information input from the RB allocation determiner 308, the coding scheme determiner 321 computes the overload ratio ol by counting the number of RBs overlapping between streams, and dividing that RB count by the number of RBs per stream.

The coding scheme determiner 321 also includes storage that stores overload ratios ol in association with modulation scheme information for each stream in advance. Table 1 illustrates exemplary relationships between the overload ratio and the modulation scheme for each stream.

TABLE 1

| Overload ratio (ol) | Stream 1 | Stream 2 |
|---|---|---|
| 0.0 | 64 QAM | 64 QAM |
| 0.0 < ol ≤ 0.25 | 64 QAM | 16 QAM |
| 0.25 < ol ≤ 0.5 | 64 QAM | 8 PSK |
| 0.5 < ol ≤ 0.75 | 64 QAM | QPSK |
| 0.75 < ol ≤ 1.0 | 64 QAM | BPSK |

In Table 1, the horizontal axis represents streams, while the vertical axis represents classifications of the overload ratio ol. Table 1 indicates that stream 1 uses 64QAM, irrespective of the overload ratio ol. However, stream 2 uses 64QAM when the overload ratio ol is zero, 16QAM when 0.0<ol≤0.25, 8PSK when 0.25<ol≤0.5, QPSK when 0.5<ol≤0.75, and BPSK when 0.75<ol≤1.0.

The coding scheme determiner 321 outputs modulation scheme information corresponding to the overload ratio ol to the transmitter 310. Consequently, the modulation scheme information is transmitted to a mobile station 4 as part of the control signal. Next, the configuration of the mobile station 4 will be described.

Figure 10:
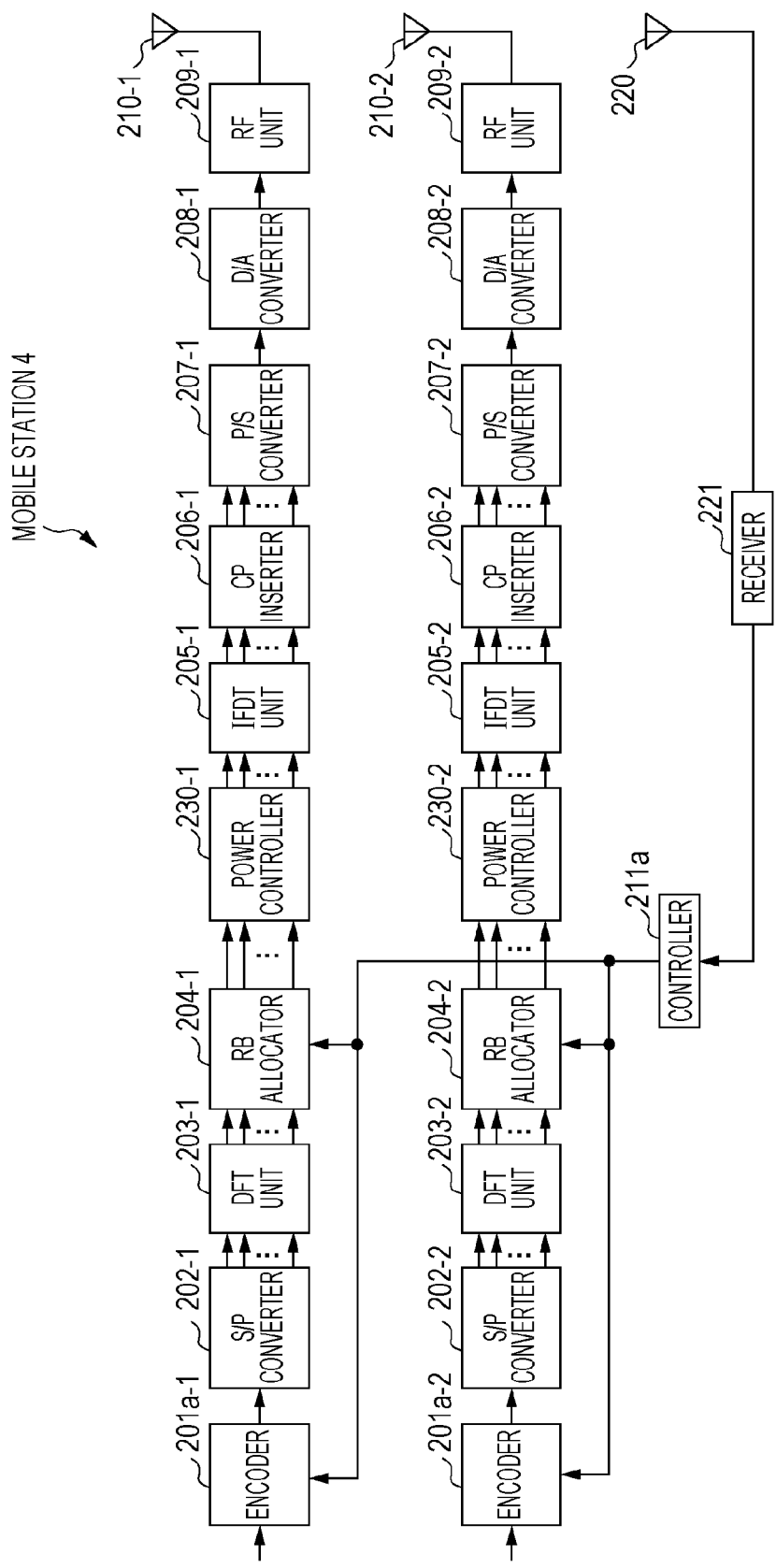
FIG. 10 is a configuration diagram illustrating an example of a mobile station according to the second embodiment of the present invention.

FIG. 10 is a configuration diagram illustrating an example of a mobile station 4 according to the present embodiment. The mobile station 4 is equipped with encoders 201*a-x* and a controller 211a instead of the encoders 201-x and the controller 211 in the mobile station 2 (FIG. 5). The controller 211a separates the modulation scheme information from the control information input from the receiver 221, and outputs the separated modulation scheme information to the encoders 201a-x. The encoders 201a-x modulate transmit data with added redundant bits as discussed earlier, according to the modulation scheme indicated by the modulation scheme information input from the controller 211a.

In this way, by changing the modulation scheme for at least one stream to a modulation scheme with fewer symbols (in other words, a modulation scheme with a lower spectral efficiency) as the overload ratio increases, it becomes possible to more easily identify the components of each stream, even if the signals in the streams interfere with each other. In other words, decreases in the likelihood computed by the demodulator 3072-x may be mitigated. Thus, the probability of turbo equalization failure in the equalizer/decoders 307-x decreases.

Note that although Table 1 illustrates an example of changing the modulation scheme for only one stream to a modulation scheme with fewer symbols as the overload ratio increases, likelihood decreases in the decoding bits for each stream are mitigated and the probability of turbo equalization failure decreases even if both streams are changed to modulation schemes with fewer symbols.

Although the above embodiment changes the modulation scheme as the overload ratio increases, the code rate for at least one of the streams may also be lowered as the overload ratio increases. Consequently, code rate information may be used instead of modulation scheme information in the coding scheme determiner 321 and the controller 211a. Accordingly, the encoders 201a-x add to the transmit data a number of redundant bits corresponding to the code rate information input by the controller 211a.

Herein, code rate refers to the proportion of the effective number of bits versus the total number of bits, and is a variable reflecting the spectral efficiency. The total number of bits is the combined total of the effective number of bits expressing the transmit signal, and the redundant bits such as error-correcting code. Consequently, if the total number of bits per frame is kept constant, the number of redundant bits increases as the code rate decreases. For this reason, it becomes possible to more accurately decode a transmit signal with the error correction processing based on redundant bits in the decoder 3074-x. Also, since the equalizer/decoders 307-x re-equalize the correctly decoded signal, it is possible to mitigate likelihood decreases and decrease the probability of equalization failure.

Likewise in this case, the code rate may also be decreased by increasing the number of redundant bits per frame in each stream as the overload ratio increases, as in the above mode.

Note that rather than using the code rate as the code rate information, it is also possible to use information related to the code rate, such as the number of redundant bits or the effective number of bits per frame, for example.

Third Embodiment

Figure 11:
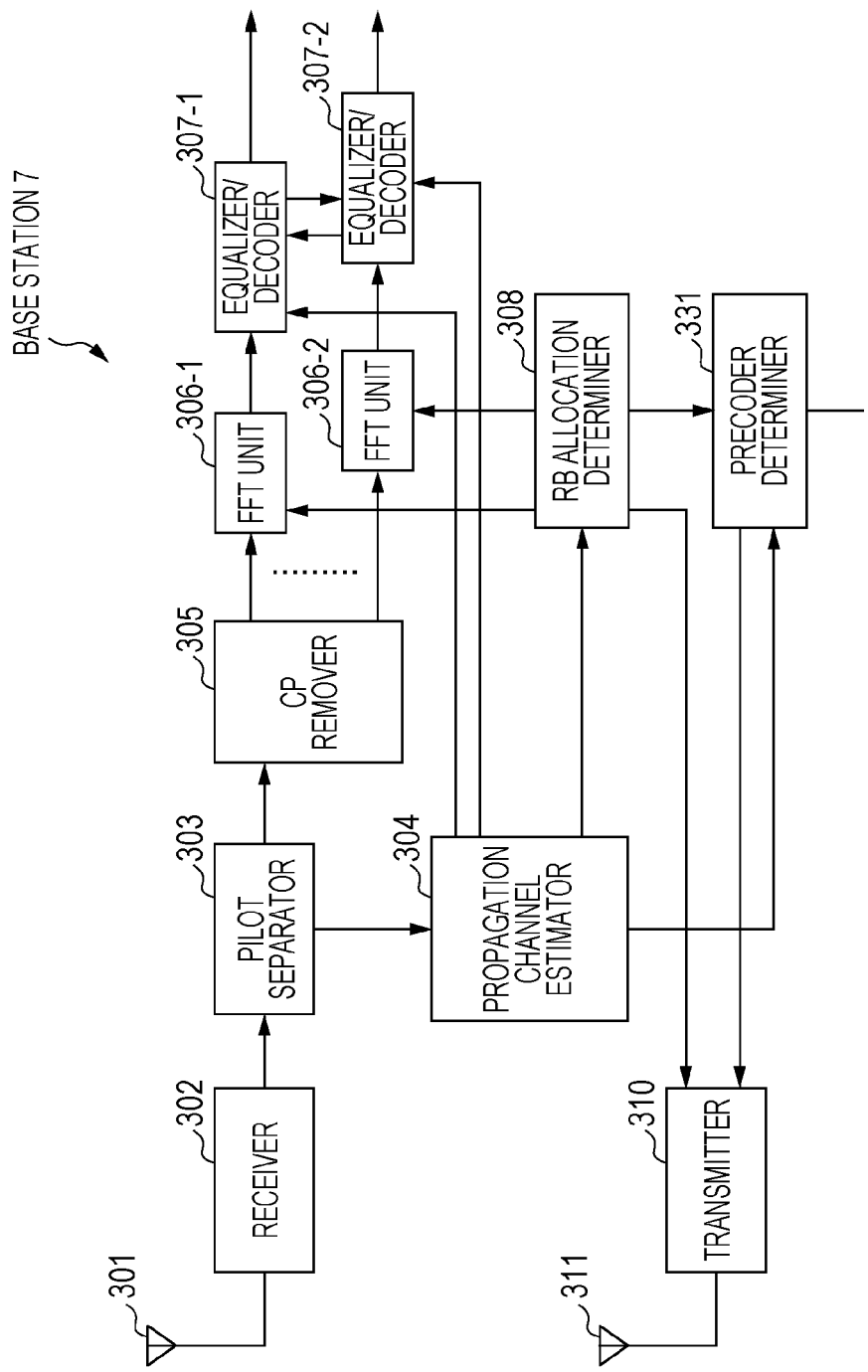
FIG. 11 is a configuration diagram illustrating an example of a base station according to the third embodiment of the present invention.

Hereinafter, a third embodiment of the present invention will be described in detail and with reference to the drawings. This embodiment also shares the configuration of the first embodiment unless specifically noted. FIG. 11 is a configuration diagram illustrating an example of a base station 7 according to the present embodiment. The base station 7 includes a precoder determiner 331 in addition to the configuration of the base station 3. The RB allocation determiner 308 also outputs per-stream RB allocation information to the precoder determiner 331 as well as the transmitter 310. On the basis of the per-stream RB allocation information input from the RB allocation determiner 308, the precoder determiner 331 computes the overload ratio ol by counting the number of RBs overlapping between streams, and dividing that RB count by the number of RBs per stream.

The precoder determiner 331 includes storage that stores multiple combinations of precoder variable information for each RB (in other words, each sub-carrier) in advance. The precoder variable information includes matrix values (number of streams x number of streams, hereinafter designated the precoder variable matrix) made up of weighting coefficients that linearly combine output signals from the RB allocators 204-x among the streams. When the overload ratio ol takes a value that is equal to or greater than a predetermined threshold, the precoder determiner 331 selects precoder variable information according to the following process.

The precoder determiner 331 accepts propagation channel frequency response information for each stream from the propagation channel estimator 304 as input. On the basis of Eq. 6, the precoder determiner 331 computes a product vector D by multiplying the frequency response vector $[h_1(k)\ h_2(k)]$, which takes the frequency response information as its elements, by the precoder variable matrix $W(c, k)$.

$$D=[h_1(k)h_2(k)]W(c,k) \quad (6)$$

Herein, k is an index indicating the sub-carrier, while c is an index indicating the selected precoder variable information. The precoder variable matrix $W(c, k)$ is specifically made up of the following elements.

$$W(c, k) = \begin{bmatrix} w_1(c, k) & w_2(c, k) \\ w_3(c, k) & w_4(c, k) \end{bmatrix} \quad (7)$$

The precoder determiner 331 then computes the second-order matrix $D^H D$ on the basis of the product vector D, and computes the eigenvalues $\lambda_t$ of the second-order matrix. Herein, H is the complex conjugate transpose, and t is an index of the eigenvalues $\lambda$, the number of which is equal to the number of streams (in the present embodiment, 2). At this point, the precoder determiner 331 selects the precoder $W(c, k)$ that maximizes the difference between the computed eigenvalues $\lambda_1$ and $\lambda_2$. The eigenvalue differential is computed according to Eq. 8.

$$|\lambda_1 - \lambda_2| \quad (8)$$

Note that the eigenvalue differential may be computed according to Eq. 9 in the case of three or more streams.

$$|Max(\lambda_t) - Min(\lambda_2)| \quad (9)$$

The precoder determiner 331 outputs the index c corresponding to the selected precoder variable information to the transmitter 310. Consequently, the index c is transmitted to a mobile station 6 as part of the control information. Note that when the overload ratio ol takes a value that is less than a predetermined threshold, the precoder determiner 331 selects and transmits the index c corresponding to the unit matrix to the mobile station 6.

Figure 12:
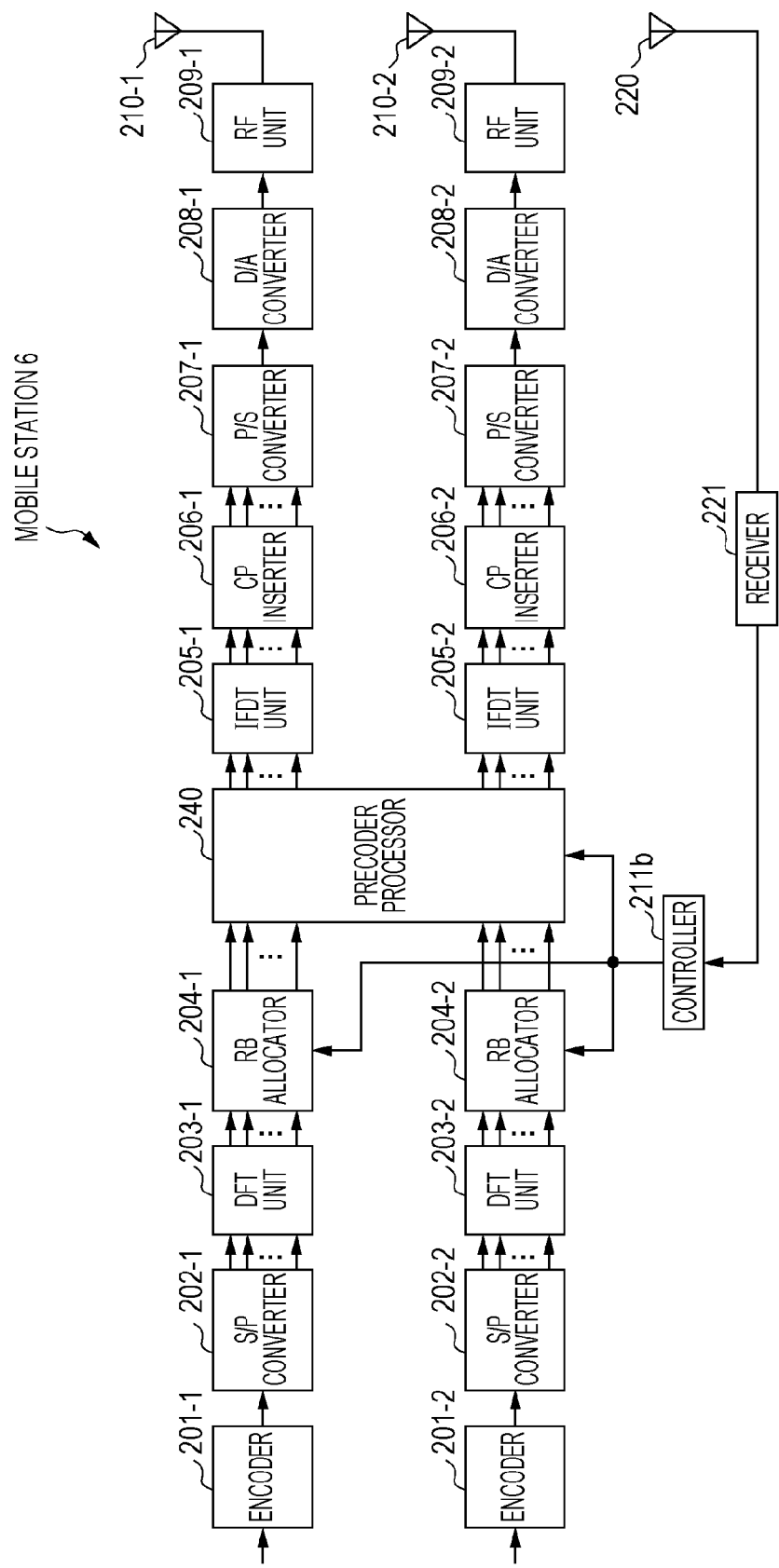
FIG. 12 is a configuration diagram illustrating an example of a mobile station according to the third embodiment of the present invention.

FIG. 12 is a configuration diagram illustrating an example of a mobile station 6 according to the present embodiment. The mobile station 6 includes a controller 211b and a precoder processor 240 instead of the controller 211 and the power controllers 230-x in the mobile station 2 (FIG. 3). The controller 211b separates the index c from the control information input from the receiver 221, and outputs the separated index c to the precoder processor 240.

The precoder processor 240 includes storage that stores multiple combinations of precoder variable information for each RB in advance, similarly to the precoder determiner 331. From the storage, the precoder processor 240 retrieves precoder variable information corresponding to the index c input from the controller 211b. The precoder processor 240 multiplies a signal vector, which takes the output signals from the RB allocators 204-x as its elements, by the retrieved precoder variable information to generate a weighted signal vector, which takes the multiplied signals as its elements. The precoder processor 240 outputs the multiplied signals to the IDFT units 205-x.

In so doing, the precoder determiner 331 selects the precoder variable matrix that maximizes the eigenvalue differential of the second-order matrix $D^H D$ in the case where the overload ratio of takes a value that is equal to or greater than a predetermined threshold. The precoder processor 240 multiplies the signal vector from the RB allocators 204-x by the selected precoder variable matrix, and is able to maximize the difference in the transmit and receive signal characteristics among the streams. Thus, it is possible to mitigate likelihood decreases in bit values computed by the demodulator 3072-x for at least one stream, and decrease the probability of turbo equalization failure. By extension, it is also possible to mitigate likelihood decreases in bit values for other streams, and decrease the probability of turbo equalization failure.

The reason why the precoder determiner 331 is able to maximize the difference in the transmit and receive characteristics will now be described.

Herein, the mutual information C between transmit and receive signals is given by the following formula.

$$C = \log_2 \det\left(I_r + \frac{1}{\sigma^2} DD^H\right)$$
$$= \log_2 \det\left(I_t + \frac{1}{\sigma^2} D^H D\right) \quad (10)$$

In Eq. 10, $\sigma^2$ is the noise power, $I_r$ is a unit matrix of size equal to the number of receive antennas by the number of receive antennas (in the present embodiment, 1×1), and $I_t$ is a unit matrix of size equal to the number of receive antennas by the number of transmit antennas (in the present embodiment, 2×2). Using the eigenvalues $\lambda_t$ of the second-order matrix $D^H D$, Eq. 10 may be rewritten as Eq. 11.

$$C = \sum_{t=1}^{2} \log\left(\lambda_t + \frac{1}{\sigma^2}\right) \quad (11)$$

In Eq. 11, the term $\log(\lambda_t + 1/\sigma^2)$ represents the contribution by an eigenvector according to the eigenvalues $\lambda_t$, or in other words the transmit and receive signal characteristics according to the weight signal obtained by multiplying the eigenvector by the precoder variable matrix. Consequently, by selecting the precoder matrix that maximizes the differential in the eigenvalues $\lambda_t$, it is possible to maximize the transmit and receive characteristics among the respective eigenvectors. Thus, it is possible to mitigate likelihood decreases for transmit signals in at least one stream having a large contribution to the eigenvector.

In this way, according to the present embodiment, it is possible to mitigate decreases in the likelihood computed by the demodulator 3072-x for at least one stream in the turbo equalization process by the equalizer/decoders 307-x. By extension, it is possible to reduce the probability of turbo equalization failure in the equalizer/decoders 307-x, and more reliably decode the transmit signals.

Note that unlike the above mode, a precoder may be selected for each RB using multiple sub-carriers, or the same precoder may be selected across the entire band.

In the foregoing first and second embodiments, the overload ratio is used to modify the transmit parameters, but the base stations 3 and 5 may also include a process of determining the streams whose respective transmit parameters are to be modified.

First, the first embodiment will be applied to describe an example of the transmit power determiner 309 determining the transmit power for each stream x as one type of transmit parameter. This configuration shares the configuration of the first embodiment unless particularly noted. The transmit power determiner 309 is configured to compute a closed-loop transmit power parameter f(x, i), while the power controllers 230-x may determine the transmit power $P_{PUSCH}(x, i)$ for each stream on the basis of Eq. 12. Additionally, the transmit power for each sub-carrier may be determined by dividing by the number of sub-carriers for each stream.

$$P_{PUSCH}(x,i) = \min\{P_{CMAX}(x), 10 \log_{10}(M_{PUSCH}(x,i)) + P_{O\_PUSCH}(x,j) + \alpha(x,j)PL(x) + \Delta_{TF}(x,i) + f(x,i)\} \quad (12)$$

In Eq. 12, all variables such as $P_{CMAX}$ are given as functions of individual streams x, but it is not strictly necessary to express all variables as functions of individual streams s, and variables which use a common value for all streams may also be partially used.

In Eq. 12, $M_{PUSCH}(x, i)$ represents the number of RBs for each stream, and takes a different value depending on the stream x. It is possible to apply control to increase the transmit power of streams x with a large number of RBs. Thus, even if the overload ratio is the same, the absolute number of RBs not overlapping across streams is increased as the number of RBs used by each stream increases, and increasing the transmit power mitigates decreases in the likelihood computed by the demodulator 3072-x. By extension, it is possible to reduce the probability of turbo equalization failure in the equalizer/decoders 307-x.

In addition, the transmit power determiner 309 may also compute the overload ratio ol for each stream on the basis of the RB allocation information determined by the RB allocation determiner 308, and compute a closed-loop transmit power parameter f(x, i) that has been increased on the basis of the change X(ol) according Eqs. 2 and 3 for each stream. Similarly, the transmit power determiner 309 may also compute, on the basis of the overload ratio ol for each stream, an increased closed-loop transmit power parameter f(x, i) that has been increased on the basis of the increase Y(ol) according Eqs. 4 and 5. The computed transmit power parameter f(x, i) is transmitted to the mobile station 2, and the transmit power controllers 203-x determine the transmit power on the basis of the receive f(x, i) for each stream x. In this way, control of the transmit power for each stream by the base station 3 is equivalent to the transmit power control in a multi-user (MU)-MIMO system in which multiple mobile stations 2 communicate using one stream each. Consequently, it is also possible to apply such a mode to an MU-MIMO system.

In addition, the second embodiment will be applied to describe an example of controlling the modulation scheme for each stream as one type of transmit parameter. In this case, the power controllers 230-x of the mobile station 4 apply control to increase the transmit power for streams with lower spectral efficiency. Spectral efficiency refers to the transmission rate of a transmit signal per unit frequency in a carrier wave. For example, in the case of controlling the modulation scheme, the transmit power is increased for streams using modulation schemes with fewer symbols to express the transmit signal. In other words, the transmit power is increased in the order of 64 QAM, 16 QAM, 8 PSK, 4 PSK, and BPSK.

This is because streams with lower transmission rates are less affected by interference among signals in overloaded RBs. For this reason, decreases in the likelihood computed by the demodulator 3072-x of the base station 5 may be mitigated. By extension, the probability of turbo equalization may be reduced, and transmit signals may be more reliably decoded. However, in the case of modifying the modulation scheme, resilience against the effects of thermal noise is increased by not including streams whose transmit power has been reduced due to an increase in the overload ratio ol as in the method based on Eq. 2. For this reason, the method based on Eqs. 4 and 5 is preferable.

Although the configuration is described as having two transmit streams and one receive stream in the description of the foregoing embodiments, in practice the configuration is not limited thereto in some cases. In the case of using three or more streams, the overload ratio may differ among the streams. In such cases, applying control to increase the transmit power for streams with a lower overload ratio makes it possible to more efficiently increase the mutual information and raise the probability of turbo equalization success.

As the number of transmit streams increases, the combinations of streams where overloading occurs becomes more complex, which makes defining the overload ratio problematic. For example, instead of ol in the embodiment discussed earlier, an overload ratio CV(x) for each stream x may be computed according to the formula.

$$CV(x) = \frac{\sum_{r=1}^{AR} \text{truth}[z(r) - y > 0]}{R(x)} \quad (13)$$

In Eq. 13, R(x) is the number of RBs used by each transmit stream x. The term z(r) is the number of transmit streams in each RB. The term r represents the RBs. The term y represents the number of receivable streams, and may be the number of receive antennas, for example. The term truth[ ] is a function that returns a value of 1 if the input condition is satisfied. In other words, Eq. 13 represents counting the number of RBs for which the number of transmit streams z(r) in each RB exceeds the number of receivable streams y, and determines the proportion of the number of such RBs to be the overload ratio CV(x). Alternatively, the overload ratio CV(x) may be defined as follows.

$$CV(x) = \frac{\sum_{r=1}^{AR} (z(r) - y)\text{truth}[z(r) - y > 0]}{R(x)} \quad (14)$$

In other words, Eq. 14 represents counting the number of RBs, weighted by the number of streams, for which the number of transmit streams z(r) in each RB exceeds the number of receivable streams y, and determines the proportion of such RBs to be the overload ratio CV(x).

In the present embodiment, it is also possible to modify the transmit parameter by determining whether or not RB overloading has occurred, depending on whether CV(x) computed with Eqs. 13 and 14 takes a value of zero or some other value.

In Eqs. 13 and 14, it is also possible to compute CV(x) by setting the value of y to an integer less than the number of receivable streams. In this case, CV(x) is not necessarily a representation of the degree of RB overlapping across streams, but is rather a measure indicating RB usage by each stream. Using a CV(x) defined in this way makes it possible to apply the present embodiment to systems that do not allow overloading.

Although the foregoing embodiments are described under the presumption that the transmit signal is a DFT-S-OFDM signal, the foregoing embodiments are also applicable to an ordinary OFDM signal and NxDFT-S-OFDM signals (using N DFT-S-OFDM signals).

Note that all or part of the communication apparatus in the foregoing embodiments, or in other words the mobile stations 2, 4, and 6 as well as the base stations 3, 5, and 7, may also be realized with a computer. In this case, a program for realizing the control functions may be recorded to a computer-readable recording medium, with the communication apparatus being realized by causing a computer system to read and execute the program recorded on the recording medium. Note that the "computer system" referred to herein is a computer system having a built-in mobile station 2, 4, or 6 or base station 3, 5, or 7, and is assumed to include an OS and hardware such as peripheral devices. In addition, the "computer-readable recording medium" refers to a portable medium such as a flexible disk, a magneto-optical disc, ROM, or a CD-ROM, or a storage device such as a hard disk built into the computer system. Furthermore, the term "computer-readable recording medium" may also encompass media that briefly or dynamically retain the program, such as a communication line in the case of transmitting the program via a network such as the Internet or a communication channel such as a telephone line, as well as media that retain the program for a given period of time, such as volatile memory inside the computer system acting as the server or client in the above case. Moreover, the above program may be for realizing part of the functions discussed earlier, and may also realize the functions discussed earlier in combination with programs already recorded to the computer system.

In addition, all or part of the mobile stations 2, 4, and 6 as well as the base stations 3, 5, and 7 in the foregoing embodiments may also be realized as a large-scale integration (LSI) or other integrated circuit. The respective function blocks of the mobile stations 2, 4, and 6 as well as the base stations 3, 5, and 7 may be realized as individual processors, or all or part thereof may be integrated into a single processor. Furthermore, the circuit integration methodology is not limited to LSI and may be also be realized with special-purpose circuits, or with general-purpose processors. In addition, if progress in semiconductor technology yields integrated circuit technology that may substitute for LSI, an integrated circuit according to that technology may also be used.

The foregoing thus describes embodiments of the present invention in detail and with reference to the drawings. However, specific configurations are not limited to the foregoing, and various design modifications and the like are possible within a scope that does not depart from the principal matter of the present invention.

INDUSTRIAL APPLICABILITY

As above, a wireless communication system, communication apparatus, communication method, and communication program according to the present invention are useful for wireless communication, and are particularly suited to mobile communication, such as with mobile phones.

REFERENCE SIGNS LIST 1 wireless communication system
2, 2-1, 2-2, 4, 6 mobile station
201-x, 201a-x encoder
202-x S/P converter
203-x DFT unit
204-x RB allocator
205-x IDFT unit
206-x CP inserter
207-x P/S converter
208-x D/A converter
209-x RF unit
210-x transmit antenna
211, 211a, 211b controller
220 receive antenna
221 receiver
230-x power controller
240 precoder processor
3, 5, 7 base station
301 receive antenna
302 receiver
303 pilot separator
304 propagation channel estimator
305 CP remover
306-x FFT unit
307-x equalizer/decoder
308 RB allocation determiner
309 transmit power determiner
310 transmitter
311 transmit antenna
321 coding scheme determiner
331 precoder determiner
3070-x soft canceller
3071-x equalizer
3072-x demodulator
3073-x deinterleaver
3074-x decoder
3075-x interleaver
3076-x soft replica generator
3077-x propagation channel characteristics multiplier
3078-x equalizer function unit

The invention claimed is:

1. A communication apparatus configured to transmit a plurality of data streams including at least a first stream and a second stream, the communication apparatus comprising:
a resource block allocation determiner configured to determine an allocation of resource blocks to be used when transmitting the first and second streams; and
a control information determiner configured to determine control information regarding data transmission on at least the first stream, on the basis of the overload ratio of resource blocks in the first and second streams, wherein
in the case where one of at least a modulation scheme or a coding rate is different between the first stream and the second stream, a transmit power is allocated to a stream having low spectrum efficiency, and said first and second streams are transmitted on the basis of said determined control information, wherein
the control information is modulation scheme information, the control information additionally includes transmit power information, and
in the control information determiner, the transmit power information is determined such that the transmit power increases for streams having a modulation scheme with lower spectral efficiency as indicated by the modulation scheme information.

2. The communication apparatus according to claim 1, wherein
said overload ratio includes at least values of 0 and 1.

3. A communication apparatus configured to transmit a plurality of data streams including at least a first stream and a second stream, the communication apparatus comprising:
a resource block allocation determiner configured to determine an allocation of resource blocks to be used when transmitting the first and second streams; and
a control information determiner configured to determine control information regarding data transmission on at least the first stream, on the basis of the overload ratio of resource blocks in the first and second streams, wherein
in the case where one of at least a modulation scheme or a coding rate is different between the first stream and the second stream, a transmit power is allocated to a stream having low spectrum efficiency, and said first and second streams are transmitted on the basis of said determined control information, wherein
the control information is code rate information,
the control information includes transmit power information, and
in the control information determiner, the transmit power information is determined such that the transmit power increases for streams having a code rate with lower spectral efficiency.

4. The communication apparatus according to claim 3, wherein
said overload ratio includes at least values of 0 and 1.

5. A communication method configured to transmit a plurality of data streams including at least a first stream and a second stream, wherein a processor is configured to perform and/or execute the communication method, the communication method comprising:
determining an allocation of resource blocks to be used when transmitting the first and second streams; and
determining control information regarding data transmission on at least the first stream, on the basis of the overload ratio of resource blocks in the first and second streams, wherein
in the case where one of at least a modulation scheme or a coding rate is different between the first stream and the second stream, a transmit power is allocated to a stream having low spectrum efficiency, and said first and second streams are transmitted on the basis of said determined control information, wherein
the control information is modulation scheme information,
the control information additionally includes transmit power information, and
the transmit power information is determined such that the transmit power increases for streams having a modulation scheme with lower spectral efficiency as indicated by the modulation scheme information.

6. The communication method according to claim 5, wherein
said overload ratio includes at least values of 0 and 1.

* * * * *